(12) United States Patent
Williams

(10) Patent No.: US 6,289,626 B1
(45) Date of Patent: Sep. 18, 2001

(54) REMOTELY ACTIVATABLE ATTRACTANT FOR DEER

(76) Inventor: Hershel Earnest Williams, 17510 Wise Rd., Winnie, TX (US) 77665

( * ) Notice: Subject to any disclaimer, the term of this patent is extended or adjusted under 35 U.S.C. 154(b) by 0 days.

(21) Appl. No.: 09/519,168

(22) Filed: Mar. 6, 2000

(51) Int. Cl.$^7$ .................................................. A01M 31/06
(52) U.S. Cl. ...................................... 43/2; 43/1; 446/397
(58) Field of Search .............................. 43/1, 2; 446/397, 446/418, 419, 361–364; 40/411, 418–420

(56) References Cited

U.S. PATENT DOCUMENTS

| | | | | |
|---|---|---|---|---|
| 423,757 | * | 3/1890 | Goldsborough | 446/361 |
| 1,428,216 | * | 9/1922 | Chase | 43/3 |
| 4,610,641 | * | 9/1986 | Allen | 446/397 |
| 4,773,178 | * | 9/1988 | Marek | 43/2 |
| 4,850,928 | * | 7/1989 | Stewart | 446/397 |
| 4,852,288 | * | 8/1989 | Payne et al. | 43/2 |
| 4,934,088 | * | 6/1990 | Pine, Jr. et al. | 43/2 |
| 4,965,953 | * | 10/1990 | McKinney | 43/2 |
| 5,029,408 | * | 7/1991 | Smith | 43/1 |
| 5,168,649 | * | 12/1992 | Wright | 43/2 |
| 5,233,780 | * | 8/1993 | Overholt | 43/2 |
| 5,274,942 | * | 1/1994 | Lanius | 43/2 |
| 5,335,438 | * | 8/1994 | Terrill | 43/1 |
| 5,402,102 | * | 3/1995 | Lachance | 446/397 |
| 5,459,958 | * | 10/1995 | Reinke | 43/2 |
| 5,546,692 | * | 8/1996 | Byers | 43/2 |
| 5,555,664 | * | 9/1996 | Shockley | 43/1 |
| 5,632,110 | * | 5/1997 | Roy | 43/2 |
| 5,791,081 | * | 8/1998 | Turner et al. | 43/2 |
| 5,826,364 | * | 10/1998 | Bitting | 43/2 |
| 5,832,649 | * | 11/1998 | Kilgore | 43/2 |
| 5,928,056 | * | 7/1999 | Molotschko | 446/397 |
| 6,021,594 | * | 2/2000 | Krueger | 43/2 |
| 6,053,793 | * | 4/2000 | Green | 446/397 |

* cited by examiner

Primary Examiner—Darren W. Ark
(74) Attorney, Agent, or Firm—Beirne Maynard & Parson, LLP

(57) ABSTRACT

A remotely activatable attractant for deer includes a plurality of armatures moveable between two positions and including biasing means to urge the armatures in a direction to one position and further including a member for the simulation of the rattling sound of the inter-engagement of deer antlers. An exciter is selectively manipulatable for activation of the armatures by a control mechanism which is operated from a remote location.

8 Claims, 3 Drawing Sheets

REMOTELY ACTIVATABLE ATTRACTANT FOR DEER

BACKGROUND OF THE INVENTION (1) Field of the Invention

The invention relates to a remotely activatable attractant for deer, for hunting, photographic or general human observation purposes.

(2) Brief Description of the Prior Art

As hunters have known for years and centuries, deer can be lured in several ways. Food, sex, and curiosity are common ways of luring deer into an area. Deer hunting generally takes place during the fall of the year and often times the deer hunting season is timed to coincide with the mating season of deer. During the mating season, male deer often compete with one another for territory and females with which to mate. In the process of competing for mates, male deer frequently will fight by locking antlers with one another and pushing and thrusting in order to demonstrate dominance. During the mating season, or "rut" as it is more commonly called, male deer in any given territory are very sensitive to intrusion by other males and are disposed toward investigating any competition among other males which takes place in their territory.

An understanding of "scrapes" is important to an understanding of deer hunting. A "scrape" is the resultant geographical area provided by a buck which has pawed out a small circular area in the dirt upon which he urinates. The buck may leave several scrapes in his territory for the purpose of luring receptive does to the area. A doe will find the scrapes and if she is in a receptive state, she will also urinate in the scrapes. The buck will scent check the scrapes on a regular basis. Upon finding that the scrape has been anointed by a doe, the buck will trail the receptive doe with the intentions of breeding her. However, deer in general, and particularly white tailed deer, are very wary by nature. This is particularly true of the more mature male deer who have survived several seasons of hunting pressure and competition for food and mates by virtue of their wits and instincts.

In surviving in the wild, deer rely on sight, sound and smell. It is an observable basic instinct of deer to maneuver themselves into a position so as to be able to scent or hear any activities which they wish to investigate. Accordingly, when male deer are investigating what they believe to be a contest among other males for territory and mates who have accidentally or intentionally entered within one of the scrapes, their first instinct is to approach such a conflict from a position to learn more about the situation before approaching the contestant or contestants who are challenging the dominance of the particular buck in his hunt for a mate in order to drive out of the boundary of the scrapes the intruding buck or bucks.

One time-honored means of attracting deer to a hunter is to initiate the sound of a deer contest by clashing or "rattling" antlers together. This may be accomplished with the use of real antlers or synthetic or imitation antlers. Most often such rattling is accomplished by a hunter holding an antler in each hand and striking the same together in a measured pattern to simulate the rattling sound of the inter-engagement of deer antlers of the protruding buck or bucks either in a contest between one another or by the buck rubbing his antlers against a tree, bush, rock, fence post, or other such "reference." Unfortunately, when such a rattling takes place, most deer investigating the same will approach from a downwind position and will actually smell the hunter creating the rattling noises, perhaps even before the hunter has a chance to see the investigating deer. This is particularly true of the larger, more wary and generally more desirable male deer.

The present invention addresses many of the problems identified in prior art methods and apparatuses as generally above-described.

SUMMARY OF THE INVENTION

The invention is directed to a remotely activatable attractant for the hunting, photographing, or general observation of deer. The attractant provides means for positioning the attractant in a stabilized mode relative to a reference, such as a tree, a fence post, a bush, a rock, or a structure such as the leg of a portable hunting tower, or the like. The attractant further includes two or more armatures which are moveable in at least one direction to a first position, such as expanded position, and which also is biased toward another position, such as the contracted position. The attractant further includes biasing means, such as a compressed metallic spring, operatively joining the armatures through simulation mean. Means are provided which extend from each of the armatures and include outboard ends and which are repeatably moveable into audible contacting relationship as the armatures are moved in at least one direction to simulate the rattling sound of the inter-engagement of deer antlers.

The remotely activatable attractant further includes an exciter for selectively manipulating the armatures in at least one direction. The exciter may be a pneumatic, hydraulic, electric or similar motor, pump or, preferably, simply ropes, cords, or similar means secured to each of the outboard ends or other location relative to the armatures for flexing the armatures to operative conditions.

Finally, the attractant includes a control mechanism operable from a remote location for activating the exciter. The control mechanism may be a battery or other electrically activated radio signaling device, pneumatic or hydraulic valving, or a conduit, such as a control line or cord extending any number of feet, for example, 30 to 50 feet to the remote location, such as within a tripod-positioned hunting tower and activated by application of a pulling force through the conduit by the hunter.

DESCRIPTION OF THE PREFERRED EMBODIMENTS

Figure 1:
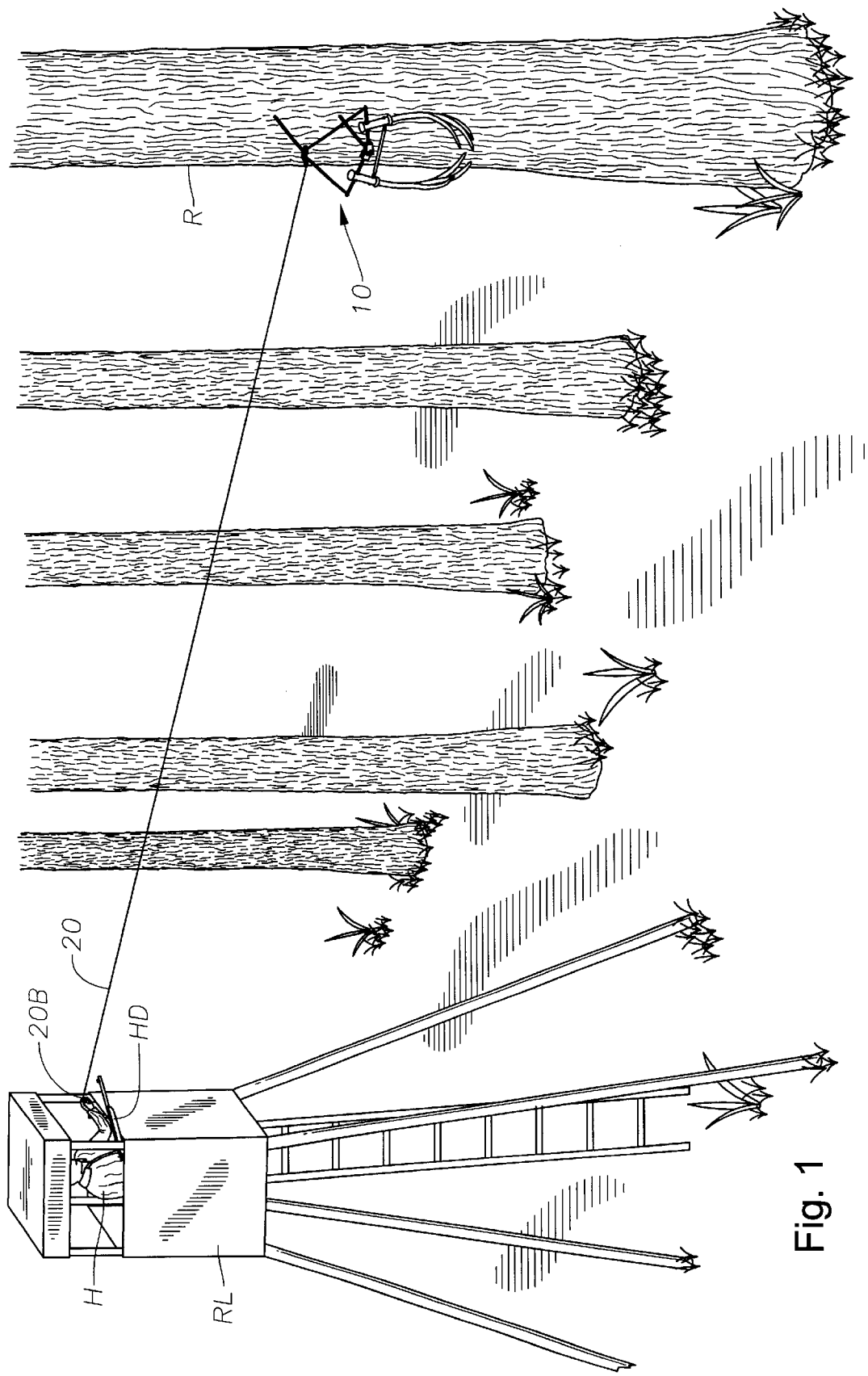
FIG. 1 is a perspective view of the attractant of the present invention in a stabilized mode relative to a reference, such as a tree, and in the ready position for operation by a hunter at a remote location.
Figure 2:
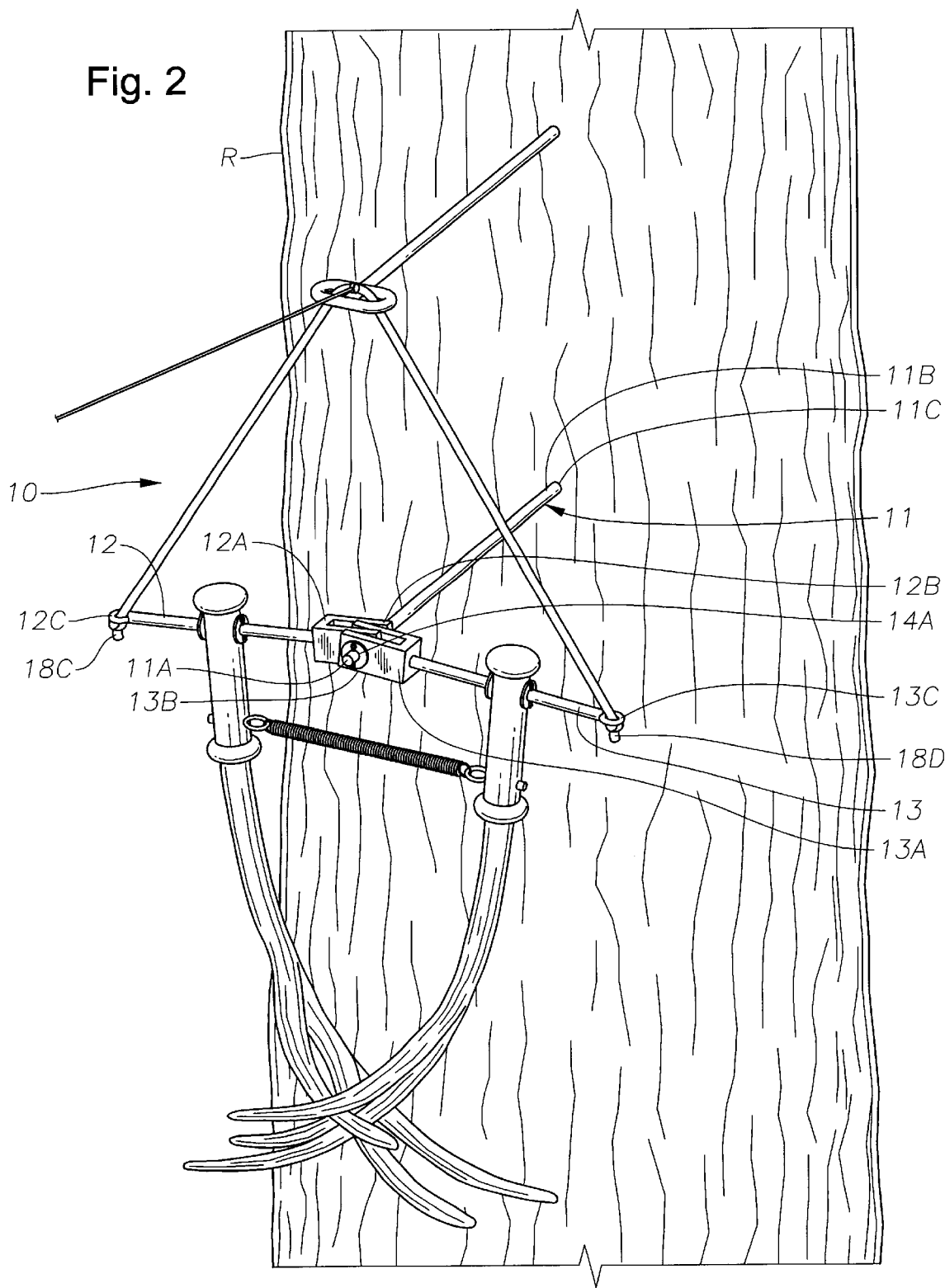
FIG. 2 is a view of the apparatus of the present invention illustrating the relative positioning of the component parts subsequent to initial activation of a pulling force through the preferred conduit by the hunter.
Figure 3:
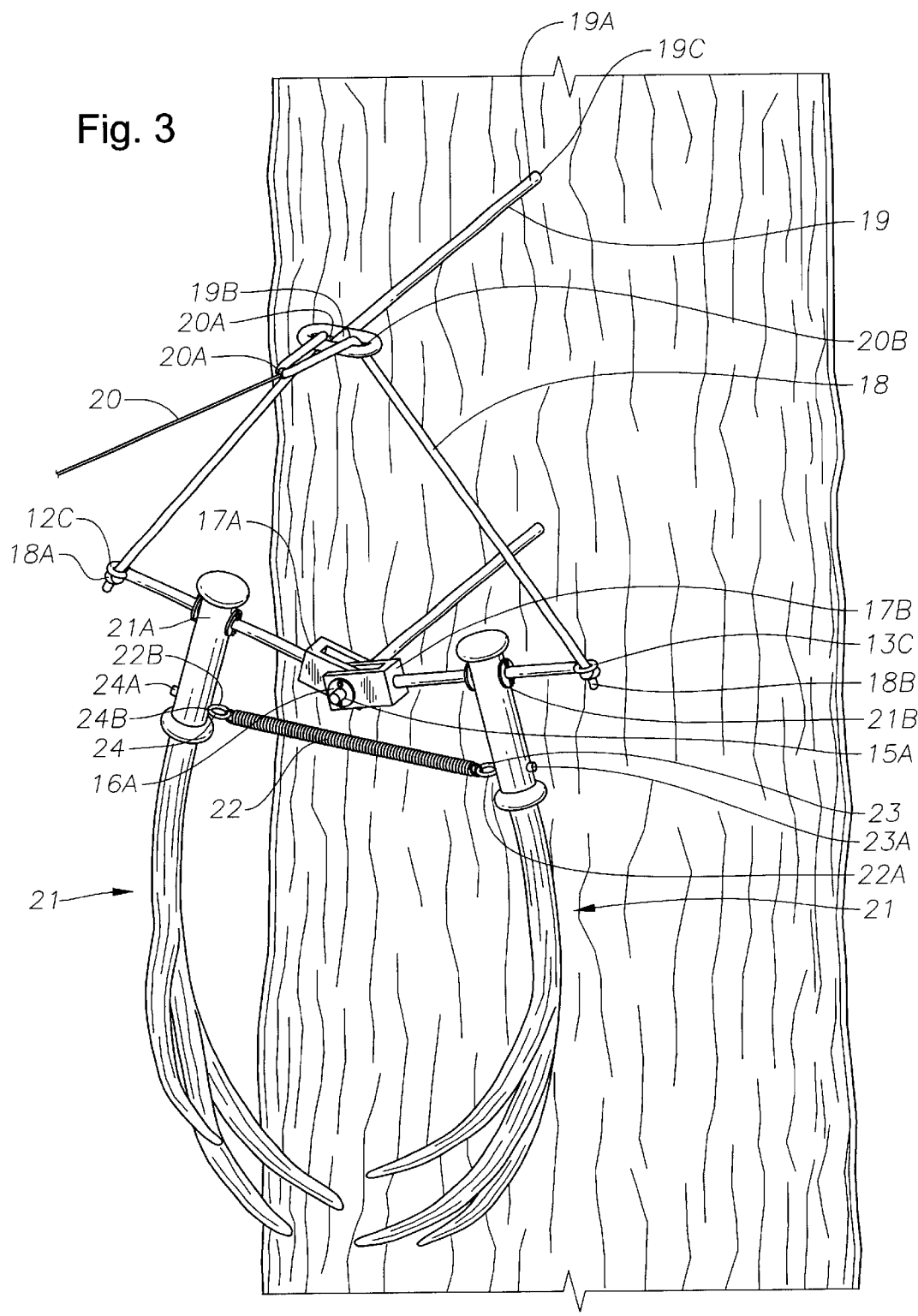
FIG. 3 is a view similar to that of FIG. 2 illustrating the movement of the attractant armatures to the expanded to thereafter move the means extending from the armatures into audible contacting relationship as shown in FIG. 2.

Now, with first reference to FIGS. 1 and 2, the apparatus 10 is shown in installed position relative to a reference R. The reference R is intended to stabilize the apparatus 10 during operational movements of the various components, as described above. The reference R preferably will be a tree, but could be a fence post, utility pole, a leg of a tripod or similar structure supporting a hunter's nest or similar natural or man-made object.

The apparatus 10 is installed relative to the reference R by use of the positioning means 11, which may take the form of a rod or bar made of metal, and having an inboard end 11A and an opposing outboard end 11B terminating in a conically tapered sharp point 11C for stabbing or hammering into the reference R.

Extending away from the positioning means 11 is a first armature 12 which is secured at one end thereof by means of a saddle 12A having bores 12B extending there through for receipt of the positioning means 11 there through. Likewise, a second armature 13 includes a similar saddle 13A having a bore of 13B there through also for carriage by the positioning means 11 at the inboard end 11A. Washers 14A are positioned around the positioning means 11 immediate each of the armatures 12 and 13 and cotter or other pins 15A are placed through openings 16A in the positioning means 11 for securement purposes.

Preferably, the armatures 12 and 13 will be solid rod-like components, made of metal, plastic, or similar solid structure. The armatures 12 and 13 are, in turn, secured to the respective saddles 12A, 13A by means of securement 17A and 17B, which simply may be a weldment or any other type of affixation generally known to those skilled in the art. The armatures 12 and 13 may be secured relative to the saddles 12A and 13A permanently, or may be threadedly or otherwise engaged for convenient removal of the armatures 12 and 13 relative to the positioning means 11 for easy transport or storage purposes.

Each of the armatures 12 and 13 have openings or eyes 12C and 13C, respectively, at their outboard-most end for receipt of an exciter, such as a rope, wire, or the like, having first and second ends 18A and 18B. One end of the exciter 18 is secured through one of the eyes 12C, 13C while the second end of the exciter 18 is secured through the other of the eyes 12C and 13C and positioned therein such as by provision of knots 18C and 18D.

Prior to installing the exciter 18 as above described, the first and second ends 18A, 18B are passed through semi-circularly shaped openings 20A, 20B, respectively, at the inboard end 19B of a spike 19. The spike 19 has an outboard end 19A similar to the outboard end 11B of the positioning means 11 which also includes a conically tapered sharp point 19C for positioning relative to a reference R as above described, preferably upwardly relative to the positioning means 11.

The apparatus 10 also includes a control conduit 20 for remote activation of the exciter 18. The control conduit 20 is preferably illustrated as a length, i.e., 50 to 100 feet, of a synthetic yarn woven into rope or line. The control line 20 has a first end 20A secured to the approximate middle of exciter 18 and a second end 20B which may be held in the hand HD of the hunter H at a remote location RL.

The exciter 18 could comprise an electrically, pneumatically or hydraulically actuated motor and, in such case, the control conduit could be an electrical cord, or tubular plastic or the like carrying pressured hydraulic or pneumatic control fluid to a motor or actuator system.

As illustrated, the apparatus 10 provides simulation means 21 which are secured to each of the first and second armatures 12, 13 through openings 21A, 21B. The simulation means may be a set of real deer antlers, or, alternatively, may be one of a number of synthetic antlers commercially available from a number of sources. When using natural antlers, the horns are cut from the prize deer, cleaned and sanded. Such antlers may be soaked in water every two or three days or treated with linseed oil to keep them from becoming chalky and thus losing their original, natural sound when clashed together. However, the availability of larger sized antlers which are believed to be most suitable for attracting deer is limited and even those who have such antlers may hesitate to destroying their aesthetic value.

Hence, the apparatus 10 of the present invention contemplates using artificial simulation means 21 made of known synthetic polymers. For example, it is known to make such antlers from a synthetic polymer which has a specific gravity from about 0.8 to about 1.2 formed as an integral piece by conventional plastic molding techniques such as injection molding. The desired specific gravity may be achieved by incorporating a suitable blowing agent such as baking soda, into the synthetic polymer, in an amount sufficient to achieve the desired specific gravity. This may produce a porous, blown, or foamed plastic structure. Additionally, talc may be mixed into the polymer during the molding operation. It is known to utilize about 1 gram of a blowing agent such as baking soda and about ½ gram of talc added for every 100th gram of a medium of high impact styrene. It is known that these portions produce a very desirable sound when the members are clashed together.

The apparatus 10 also includes a biasing means 22, such as a coiled metallic spring. The biasing means 22 has a first end 22A extending through an eye screw 23 positioned within an opening 23A of the simulation means 21. The biasing means 22 also has another, opposing, end 22B extending through a similar eye screw 24 in a second opening 24B of a member of the simulation means 21. Threaded bolts 23A and 24A secure the respective eye screws 23 and 24 relative to the simulation means 21.

Operation

The apparatus 10 is quickly and conveniently made operational by first stabbing, hammering, or otherwise securing the conically tapered sharp point 11C at the outboard end 11A of the positioning means 11 to the reference R. Likewise, a spike 19 is secured to the reference R by similar affixation of the conically tapered sharp point 19C thereto, and just above the positioning means 11. The second end 20B of the control conduit 20 is placed in the hand HD of the hunter H who is positioned at a remote station, such as in a hunting stand affixed above a tripod. The hunter H will want to test the operation of the apparatus 10 first by pulling on the control conduit 20. As the control conduit 20 is pulled, the exciter 18 moves each of the armatures 12 and 13 upwardly, slightly, relative to the positioning means 11. A slight release of tension on the control conduit 20 by the hunter H will cause the simulation means 21 to come together for clashing as a result of the bias exerted through the biasing member 22, urging the simulation means 21 toward one another. This movement may be repeated to cause simulation of a rattling sound of the inter-engagement of deer antlers. Hopefully, a buck is not far away.

Although the invention has been described in terms of specified embodiments which are set forth in detail, it should be understood that this is by illustration only that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A remotely activatable attractant for deer, comprising:
   (a) means for positioning the attractant in a stabilized mode relative to a reference;
   (b) a plurality of armatures;
   (c) means extending from each of the armatures which are moveable in at least one direction to a first position and biased toward a second position and including outboard ends and repeatably moveable into audible contacting relationship as said means extending from each of the armatures are moved in said at least one direction to simulate rattling sounds of inter-engagement of deer antlers;
   (d) biasing means joining said means extending from each of the armatures;
   (e) an exciter for selectively manipulating the armatures to cause said means extending from each of the armatures to move in said at least one direction; and
   (f) a control mechanism operable from a remote location for activating the exciter.

2. A remotely activatable attractant for deer, comprising:
   (a) means for positioning the attractant in a stabilized mode relative to a reference;
   (b) a plurality of armatures each having an outboard end;
   (c) means extending from each of the armatures which are moveable in at least one direction to an expanded position and biased toward a contracted position and repeatably movable into audible contacting relationship as said means extending from each of the armatures are moved in said at least one direction to simulate a rattling sound of inter-engagement of deer antlers;
   (d) biasing means joining said means extending from each of the armatures;
   (e) an exciter for selectively manipulating the armatures to cause said means extending from each of the armatures to move in said at least one direction; and
   (f) a control mechanism operable from a remote location for activating the exciter.

3. The remotely activatable attractant of claim 2 wherein the control mechanism includes a conduit for extending to said remote location for activating the exciter by application of a pulling force along the conduit.

4. The remotely activatable attractant of claim 2 wherein the positioning means comprises an elongated rod.

5. The remotely activatable attractant of claim 2 wherein the biasing means comprises a compressible spring element.

6. The remotely activatable attractant of claim 2 wherein the means extending from each of the armatures comprises natural deer antlers.

7. The remotely activatable attractant of claim 2 wherein the means extending from each of the armatures comprises synthetic deer antlers.

8. The remotely activatable attractant claim 2 wherein the exciter comprises: a control rod having an opening and which can be fixedly mounted relative to the positioning means and the reference; said exciter is secured immediate each of the outboard ends of the armatures, passes through said opening and is in operative communication with the control mechanism.

* * * * *